UNITED STATES PATENT OFFICE.

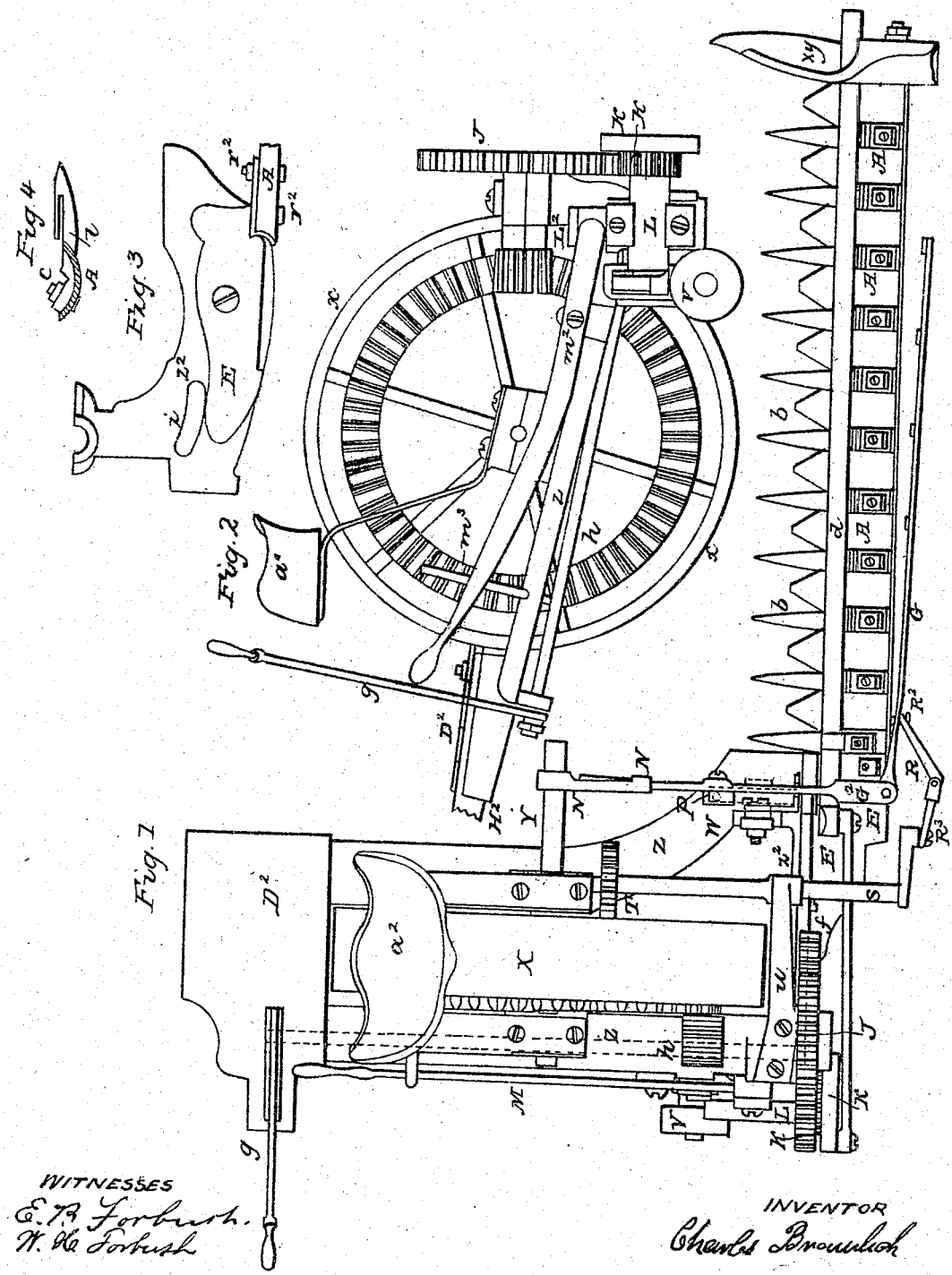

CHARLES BROWNLICH, OF BUFFALO, NEW YORK.

IMPROVEMENT IN HARVESTERS.

Specification forming part of Letters Patent No. 23,075, dated March 1, 1859.

*To all whom it may concern:*

Be it known that I, CHARLES BROWNLICH, of the city of Buffalo, in the county of Erie and State of New York, have invented certain new and useful Improvements in Harvesting-Machines; and I do hereby declare that the following is a full and exact description thereof, reference being had to the accompanying drawings and the letters of reference marked thereon.

Figure I is a plan view. Fig. II is a side elevation. Fig. III is an elevation of the pivotal shoe and the rear end of the main frame. Fig. IV is a cross-section of the finger-bar and elevation of guard-finger.

Letters of like name and kind refer to like parts in each of the figures.

A is the finger-bar. This is made of metal (I prefer boiler-iron) in the concavo-convex form. The guards $b$ rest upon the upper or concave side of the bar, and are secured thereto by means of screw-bolts $c$ passing through the bar and guards. The cutter-bar $d$ is supported upon the guards and over the finger-bar; but I contemplate making the guards of sufficient length to support and use the cutters in front of the finger-bar. This form of finger-bar combines strength with lightness of metal, and also gives a runner form in backing, as well as when moving forward.

E is a pivotal shoe. This I make of cast-iron. Its bottom part is made convex, and about seven inches of its inner end fits the concavity of the finger-bar, and is bolted thereto, as shown at $r^2$, Fig. III. The upright part of the shoe is connected to the rear end of the frame by means of a strong bolt, as shown at $f$, Fig. III. It moves freely on this bolt, so as to allow the finger-bar to conform to the unevenness of the ground or to be raised therefrom, as may be required. It has a broad bearing upon the end piece of the frame $Z^2$, so that the bolt $f$ will hold it in place and resist any lateral strain. It also has length outwardly from the bolt $f$, so as to give sufficient lever-purchase, through the action of compound levers $g$ $h$ $i$, to raise the finger-bar from the ground. $h$ lies parallel with the frame, and is connected thereto by means of two journal-bearings. $g$ is rigidly connected to $h$ at one end, and $i$ is at the other end. By lifting on $g$, $i$ is turned downward against the end of the shoe, and, the bolt $f$ serving as a fulcrum or pivotal center, the finger-bar is thereby raised from the ground quickly and easily and at any time it may be desirable to do so.

J is the multiplying-wheel. This is placed at the rear end of the machine and in line with the cutter-bar.

K is a crank-wheel. This is supported in a sliding journal-box, L, Fig. II. A flange, $L^2$, is projected from the upper end of this journal-box. The end of the lever M catches onto this flange. The lever M is pivoted to a small standard, as shown at $m^2$. The standard $m^3$ has notches which hold the lever M where placed. By a slight movement of the lever M the crank-wheel may be thrown in or out of gear with the multiplying-wheel at pleasure.

N is a tripping-arm made fast to the projecting axle of the driving-wheel.

O is a lever pivoted to a standard on the frame, as shown at P.

Q is a rake jointed to the lever O, as shown at $G^2$.

R is a lever jointed in the middle and connected to the rake by a joint, as shown at $R^2$, and connected to the crank, as shown at $R^3$.

S is a crank-shaft supported by the arm $w$, and has a bearing in the journal-box of the driving-wheel shaft.

T is a pinion on the shaft S. This pinion meshes in with a cog-rim supported on the arms of the driving-wheel.

As the machine moves forward the tripping-arm N will strike the lever O and bear it down at the proper time to raise the rake and carry it over the grain (lying and falling on the platform) to a position parallel with the cutters, at which point the tripping-arm slides off from the lever O and the rake Q falls down upon the grain which has accumulated upon the platform. The arrangement of the gear is such as to cause the rake to sweep the grain from the platform after the tripping-arm has passed off from the lever and before it again strikes the lever, and so that the tripping-arm will strike the lever and raise the rake while the rake is being carried back to its parallel position over the platform.

V and W are carrying-wheels, made adjustable by means of slotted slides and bolts, and connected to the rear end of the frame; X, driving-wheel; Y, axle of driving-wheel; Z, side pieces of frame, made of cast-iron, in a hollow half-circular or concavo-convex form, for purposes of strength and lightness; $Z^2$, rear end piece of cast-iron frame, to which the pivotal shoe is connected; $a^2$, driver's seat. The levers $g$ and M can be operated by the driver while on his seat and when the machine is in motion.

$D^2$ is a cap piece or plate, which forms a platform for the driver's feet, and also supports the lever $g$; $H^2$, draft-pole; $x\,y$, outside shoe. An adjustable wheel is also connected with this shoe.

I claim—

The pivoted shoe E, constructed as herein described, and connected to the rear end of the frame of the machine by means of the bolt $f$, upon which it oscillates, in combination with the levers $g\,h\,i$, as arranged for the purpose herein set forth.

CHARLES BROWNLICH.

Witnesses:
E. B. FORBUSH,
W. H. FORBUSH.